(12) United States Patent
Maier et al.

(10) Patent No.: US 12,240,333 B2
(45) Date of Patent: Mar. 4, 2025

(54) REDUCING SWITCHING-ON AND SWITCHING-OFF PROCESSES IN AN ELECTRIC DRIVETRAIN

(71) Applicant: Robert Bosch GmbH, Stuttgart (DE)

(72) Inventors: Joerg Maier, Ostfildern (DE); Michael Kauf, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 17/780,415

(22) PCT Filed: Nov. 12, 2020

(86) PCT No.: PCT/EP2020/081843
§ 371 (c)(1),
(2) Date: May 26, 2022

(87) PCT Pub. No.: WO2021/104886
PCT Pub. Date: Jun. 3, 2021

(65) Prior Publication Data
US 2023/0001795 A1     Jan. 5, 2023

(30) Foreign Application Priority Data

Nov. 28, 2019 (DE) ...................... 10 2019 218 454.5

(51) Int. Cl.
*B60L 3/00* (2019.01)
*B60L 53/20* (2019.01)
(Continued)

(52) U.S. Cl.
CPC ............ *B60L 3/0046* (2013.01); *B60L 53/20* (2019.02); *B60L 58/14* (2019.02); *G06Q 10/083* (2013.01);
(Continued)

(58) Field of Classification Search
CPC ..................................................... B60L 3/0046
See application file for complete search history.

(56) References Cited

U.S. PATENT DOCUMENTS 7,053,500 B2   5/2006   Furukawa et al.
10,340,834 B2 *   7/2019   Uchida ................ H02P 29/027
(Continued)

FOREIGN PATENT DOCUMENTS

CN     103097778 A     5/2013
CN     106232414 A     12/2016
(Continued)

OTHER PUBLICATIONS

Translation of International Search Report for Application No. PCT/EP2020/081843 dated Feb. 15, 2021 (3 pages).
(Continued)

*Primary Examiner* — Michael A Berns
(74) *Attorney, Agent, or Firm* — Michael Best & Friedrich LLP

(57) ABSTRACT

A method (100) for operating a vehicle (1) with an electric drive-train (2), wherein this electric drivetrain (2) is fed via a DC voltage source (3) and a converter (4) for converting the DC voltage into a single-phase or multiphase AC voltage, comprising the steps: —it is detected (110) that the vehicle (1) is stopped; —it is checked (120) on the basis of at least one specified criterion (10) whether the vehicle (1) is expected to be stopped only briefly; —in response to the fact that the vehicle (1) is expected to be stopped only briefly, the vehicle (1) is transferred (130) from the ready-to-drive state into a disabled state, wherein in this disabled state the vehicle (1) is protected against unauthorized use but the converter (4) continues to be supplied with the DC voltage from the DC voltage source (3); —in response to the fact that the vehicle (1) is not expected to be stopped only briefly, at least one functional test of the electric drivetrain (Continued)

(2), said test being provided for powering down the electric drivetrain (2), is performed (140), and after the termination of this functional test the vehicle (1) is transferred (150) into a switched-off state, in which the vehicle (1) is secured against unauthorized use and the supply of the converter (4) from the DC voltage source (3) is interrupted.

10 Claims, 3 Drawing Sheets

(51) Int. Cl.
    *B60L 58/14*     (2019.01)
    *G06Q 10/083*     (2023.01)
    *G06Q 20/34*     (2012.01)

(52) U.S. Cl.
    CPC .......... *G06Q 20/34* (2013.01); *B60L 2210/40* (2013.01); *B60L 2250/00* (2013.01); *B60L 2260/20* (2013.01)

(56) References Cited

U.S. PATENT DOCUMENTS

| | | | |
|---|---|---|---|
| 10,348,238 B2 * | 7/2019 | Sachimori | H02P 27/06 |
| 11,472,356 B2 * | 10/2022 | Murray | B60W 10/20 |
| 2023/0001795 A1 * | 1/2023 | Maier | G06Q 10/083 |

FOREIGN PATENT DOCUMENTS

| | | |
|---|---|---|
| CN | 108399688 A | 8/2018 |
| DE | 102014200262 A1 | 7/2015 |
| DE | 102015104345 A1 | 10/2015 |
| DE | 102015003231 A1 | 9/2016 |
| DE | 102017200904 A1 | 7/2018 |
| DE | 102017203054 A1 | 8/2018 |
| DE | 102017206471 A1 * | 10/2018 |
| EP | 3046198 A1 | 7/2016 |
| GB | 2551312 A | 12/2017 |
| JP | 2017093070 A | 5/2017 |
| KR | 101927853 B1 | 12/2018 |

OTHER PUBLICATIONS

Borcsok et al., "Reduzierung der Ausfallwahrscheinlichkeit und Verlangerung des Proof-Test-Intervalls durch Einsatz von Partial-Stroke-Tests am Beispiel von Stellgeraten", Sicherheit/Aktorik, atp, 2008, pp. 48-56.

Translation of Search Report issued by the Chinese Patent Office for Application No. 202080082348.3 dated Jul. 26, 2024 (3 pages).

* cited by examiner

REDUCING SWITCHING-ON AND SWITCHING-OFF PROCESSES IN AN ELECTRIC DRIVETRAIN

BACKGROUND OF THE INVENTION

The present invention relates to a method for operating a vehicle which has an electric drivetrain as an alternative to or else in addition to an internal combustion engine.

In an electric drivetrain of an electrically driven vehicle, preferably AC motors having three or more phases are used which have a good degree of efficiency and, in contrast to DC motors, manage without any wear-susceptible brushes. Electrical energy sources which can be carried along in the vehicle, such as, for example, batteries or fuel cells, generally produce a DC voltage, however. In order to convert this DC voltage into an AC voltage having three or more phases, voltage converters, such as, for example, inverters, are used.

In this case, the voltage converter is generally fed from a high-voltage vehicle power supply system which conducts a DC voltage of several hundred volts. This high-voltage vehicle power supply system is typically isolated from the DC-voltage source when the vehicle is parked. This ensures that the high voltage poses no risk while the vehicle is unattended. At the same time, it avoids a situation whereby, for example, a battery discharges gradually owing to a power loss which is continuously incident in the inverter.

DE 10 2014 200 262 A1 discloses a battery system whose high-voltage battery is connected via at least one contactor and can be isolated from the high-voltage vehicle power supply system by means of this contactor.

SUMMARY OF THE INVENTION

Within the scope of the invention, a method for operating a vehicle having an electric drivetrain has been developed. The drivetrain can drive the vehicle on its own or else, in the case of a hybrid vehicle, in combination with an internal combustion engine. The electric drivetrain is fed via a DC-voltage source and a converter for converting the DC voltage into a single-phase or polyphase AC voltage.

The method begins with the establishment of whether the vehicle is parked. "Parked" is in this case in particular understood to mean a state in which the vehicle is protected from rolling away in the sense of the traffic code so that the driver can leave his driver's seat without any risk being posed. The establishment of the fact that the vehicle is parked can be taken from any desired source. For example, the activated position of a parking brake, the switch position of a switch operable by the driver for the drivetrain or else the presence of an access medium (for example key) in a receptacle provided for this purpose can be monitored. The relationship between the presence of a key and protection from rolling away can be enforced, for example, via a lock which only enables withdrawal of the key when the protection from rolling away has been performed.

Using at least one preset criterion, a check is performed to ascertain whether the vehicle is likely to be parked for only a short time or not. In this case, the precise criterion may be specific to the respective vehicle. Essential to the progress of the method is merely the fact that a decision is made as to whether the vehicle is likely to be parked for only a short time or not.

In response to the fact that the vehicle is likely to be parked for only a short time, the vehicle is shifted into a blocking state. In this blocking state, the vehicle is protected from unauthorized use. This means that the vehicle can only be driven from its own drive by persons authorized to do so. The blocking can take place, for example, by means of software by virtue of, for example, activation of the drive for driving being suppressed. The blocking can also take place, for example, by means of hardware, however, by virtue of, for example, the steering, a transmission or a parking brake being blocked. In the blocking state, the converter continues to be supplied the DC voltage from the DC-voltage source.

In response to the fact that the vehicle is likely not to be parked for only a short time, at least one function check is performed on the electric drivetrain which is intended to ramp down the electric drivetrain. Once this function check has concluded, the vehicle is shifted to a switched-off state, in which the vehicle is protected from unauthorized use and the supply to the converter from the DC-voltage source is interrupted. In this case, the protection from unauthorized use can in particular be activated, for example, already prior to the function check.

It has been identified that it can impair the life of an electric drivetrain when this drivetrain is ramped up and ramped down too often. Thus, for example, switches which disconnect the DC-voltage source from the high-voltage vehicle power supply system can only be designed for a limited number of the order of magnitude of 100,000 switching cycles, and this maximum number is also only available when switching does not take place under load. Every time the switch needs to disconnect high currents in the event of a fault and in the process needs to quench arcs, for example, this places an even more substantial load on it.

A further component which may be susceptible to wear in the case of frequent ramping-up and ramping-down is the capacitor in the converter which buffer-stores the DC voltage. This capacitor is charged from the completely empty state to the completely full state via a resistor when the drivetrain is ramped up and is completely discharged again during ramping-down. During driving operation, relatively small quantities of energy are taken from the capacitor in order to cover peak demands and then recharged again. While this exchange of relatively small quantities of energy is negligible in relation to the life of the capacitor, the complete discharge and later complete charging promotes ageing of the capacitor.

Furthermore, complete ramping-down and then ramping-up of the electric drivetrain also costs energy. Such a cycle can cost more energy in the case of parking of the vehicle for only a short time than is saved in the switched-off state, which results in a reduced range owing to the limited energy reserve which can be carried along in the vehicle.

Vehicles which are parked for only a short time very often are in particular utility vehicles for delivering goods, consignments of letters, consignments of packages and/or piece goods. On a delivery run in a densely built-up area, often only a few meters are driven until the vehicle is parked again and the driver searches for the next house. Model calculations have therefore shown that, for example, said switch for the disconnection of the DC voltage source from the high-voltage vehicle power supply system, which is designed for 100,000 switching operations, can last in a passenger vehicle completely for the entire use duration of this passenger vehicle. A delivery vehicle of the mentioned type, on the other hand, would already come across many more switching operations, with the result that, within the use duration of the vehicle, a replacement of the switch would be due once or even more than once. By virtue of unnecessary switching operations being avoided, therefore unnecessary downtimes and repair costs can be avoided.

The criterion for the check as to whether the vehicle is likely to be parked for only a short time or not is freely selectable and can in particular also depend on the type and intended use of the vehicle.

For example, the criterion can comprise a comparison of the present position of the vehicle with at least one geographical area which is associated with a short-term or non-short-term parking of the vehicle. In the mentioned example of the delivery vehicle, for example, the delivery depot in which the vehicle is completely filled with consignments is a location at which the vehicle is generally at a standstill for a relatively long period of time. The delivery area in which the consignments are delivered, on the other hand, is an area in which the vehicle is very often parked for only a short time in the described way and then driven again for a few meters in order that the delivery person does not have to carry heavy packages, for example, further than is absolutely necessary.

As an alternative or else in combination with this, the preset criterion can comprise, for example, a removal from the vehicle of a mobile electronic device which is carried along in the vehicle prior to the parking of the vehicle. Behind this lies the knowledge that activities outside the vehicle which, when concluded, are followed by the vehicle being brought into operation again soon, often take place in the direct vicinity of the vehicle. When, for example, a driver of a hybrid vehicle fills up with fuel, though he needs to leave the vehicle, he will continue to drive again as early as after a few minutes. Likewise, a delivery driver on his delivery run will remove himself from his vehicle only by a few ten to a maximum a few hundred meters and bring the vehicle back into operation as soon as he has delivered all of the consignments for a specific location. The distance can be measured by any desired means, such as, for example, by virtue of the signal strength on a radio path over which the vehicle communicates with the device. The device can, however, also determine its position, for example, by evaluation of the signals received from satellites of a navigation system and/or by evaluation of the signals received from WLAN networks and other terrestrial sources and then send it to the vehicle.

The mobile electronic device may in particular be, for example, a mobile telephone, a tablet computer, a device for accepting card payments, a device for confirming the delivery of consignments and/or a vehicle key. These devices are generally carried along when the vehicle is left for activities outside the vehicle.

The device for accepting card payments and the device for confirming the delivery of consignments in this case also have the particular advantage that it can be hereby decided whether the vehicle is actually being left for the delivery of goods or consignments or for a different reason. If the vehicle is being left for a different reason, devices which are used specifically in the delivery of goods or consignments are generally not taken along.

A mobile telephone has the particular advantage that it is often already known to the hands-free device of the vehicle via Bluetooth or another short-range radio technology, and the vehicle key is known to the vehicle itself. However, the mobile telephone can communicate with the vehicle over a greater range than the radio key, whose radio radius is only a few meters for security reasons.

Finally, the driver of the vehicle can also himself make an input in respect of whether short-term or non-short-term parking of the vehicle is intended. An automated prognosis as to whether the vehicle is parked for only a short time or not naturally has the advantage that the driver does not need to think about protecting the electric drivetrain.

The preset criterion can alternatively or in combination with this also operate on further data sources. For example, sensor data which are detected in or on the vehicle and/or the present time of day can be correlated with an activity plan for the vehicle and/or for the driver.

Advantageously, in the blocking state, a check continues to be performed using at least one preset criterion to ascertain whether the vehicle is likely to be parked for only a short time. In response to the fact that, in accordance with this check, the vehicle is likely not to be parked for only a short time, it is shifted to the switched-off state. The criterion checked in the blocking state can be identical to the criterion on the basis of which the vehicle was previously shifted to the blocking state. However this is not essential. The check in the blocking state as well has the advantage that, in the case of activities outside the vehicle which were originally planned as short activities but then last longer than planned, excessive discharge of the battery can be avoided without the driver needing to act on the vehicle from afar or even come back to the vehicle for this purpose.

Irrespective of this check, generally the vehicle can be shifted from the blocking state to the switched-off state, for example, in response to the fact that a preset time span has elapsed since the transition from the drive-ready state to the blocking state. This avoids an unnecessary energy consumption by the converter, for example an inverter, and at the same time ensures that it is not possible for a hazard to arise as a result of the high DC voltage when the vehicle is left unattended for a relatively long time.

The vehicle can also be shifted from the blocking state to the switched-off state, for example, in response to the fact that the energy reserve of the DC-voltage source falls below a preset threshold value. In this way, it is possible in particular to avoid a situation whereby the remaining residual range of the vehicle falls below a value which is required for a planned continued journey.

Advantageously, the vehicle is shifted to the drive-ready state starting from the blocking state, and/or from the switched-off state, in response to the fact that a driver of the vehicle is legitimized with respect to the vehicle. This legitimization can take place in any desired manner, for example by means of a vehicle key, by means of another personalized access medium (such as, for example, a mobile telephone), by means of biometric identification of the driver and/or by means of input of a password, a PIN or another secret. In this case, different legitimization criteria can apply in particular, for example, for the transition from the blocking state to the drive-ready state, on the one hand, and for the transition from the switched-off state to the drive-ready state, on the other hand. Thus, for example, the legitimization can be simplified starting from the blocking state since it is performed very often in the course of a working day.

The transition from the blocking state to the switched-off state can in particular include, for example,
  switching off a switch in the form of a mechanical switch or in the form of a contactor for the supply to the converter from the DC-voltage source, and/or
  discharging a capacitor in the converter which buffer-stores the DC voltage from the DC-voltage source.

In this case, a contactor does not necessarily need to operate electromechanically and/or electromagnetically, but can also use, for example, power semiconductors as switching elements.

As previously explained, precisely said switches can only be designed for a limited number of switching cycles, and a complete discharge and later complete charging of the capacitor promotes ageing thereof. Therefore, avoiding unnecessary cycles extends the life of these components.

The method can in particular be wholly or partially computer-implemented. Therefore, the invention also relates to a computer program having machine-readable instructions which, when implemented on one or more computers, instruct the computer(s) to implement the method. In this sense, control devices for vehicles and embedded systems for technical devices which are likewise capable of implementing machine-readable instructions should also be considered as computers.

Likewise, the invention also relates to a machine-readable data carrier and/or to a download product having the computer program. A download product is a digital product which can be transmitted via a data network, i.e. can be downloaded by a user of the data network, and which can be offered for sale, for example, in an online shop for immediate download.

Furthermore, a computer may be equipped with the computer program, with the machine-readable data carrier or with the download product.

BRIEF DESCRIPTION OF THE DRAWINGS

Further measures improving the invention will be illustrated in more detail below together with the description of the preferred exemplary embodiments of the invention with reference to the figures.

In the drawings.

DETAILED DESCRIPTION

Figure 1A:
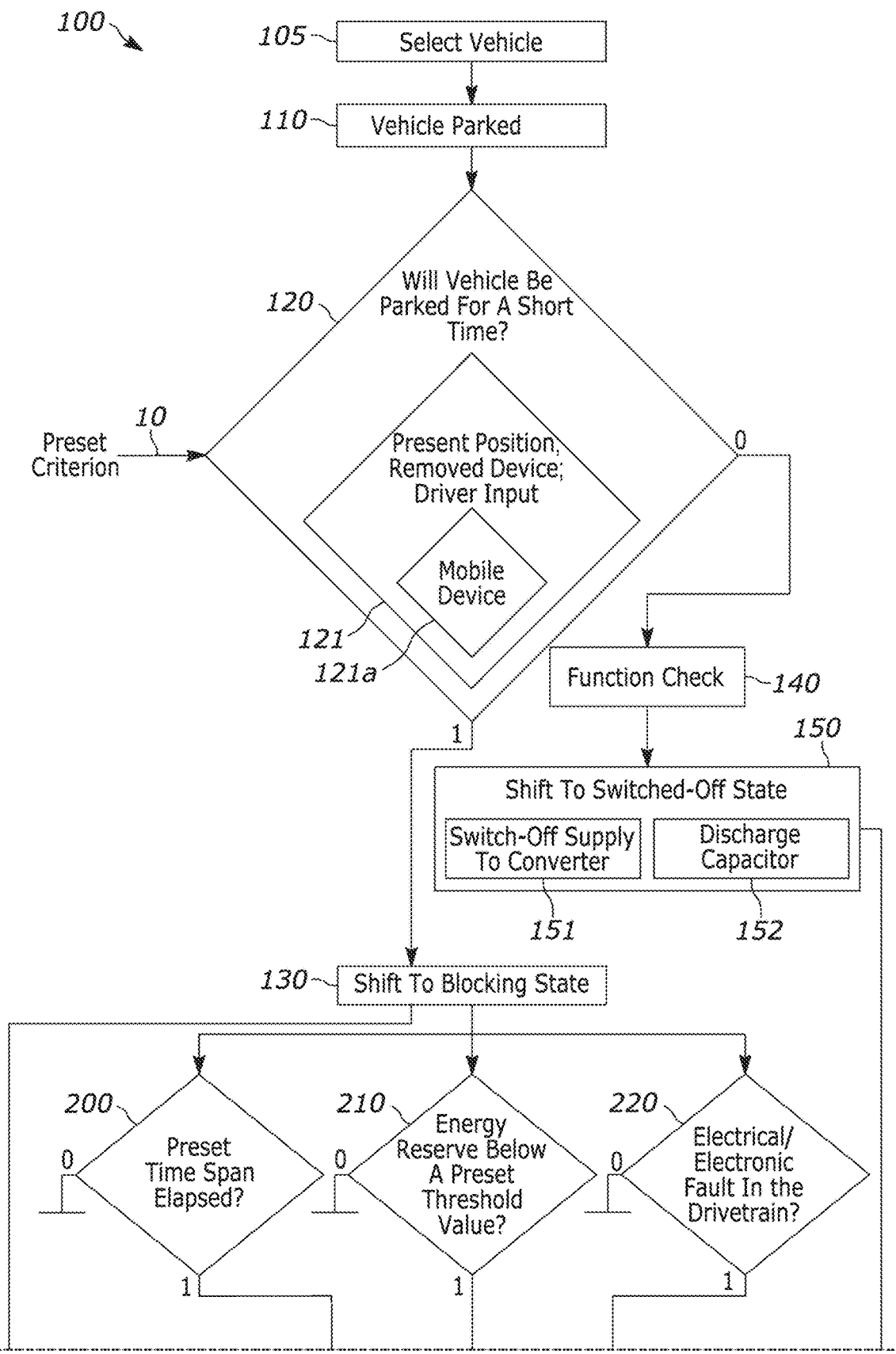
FIG. 1A shows an exemplary embodiment, in part, of the method 100.
Figure 1B:
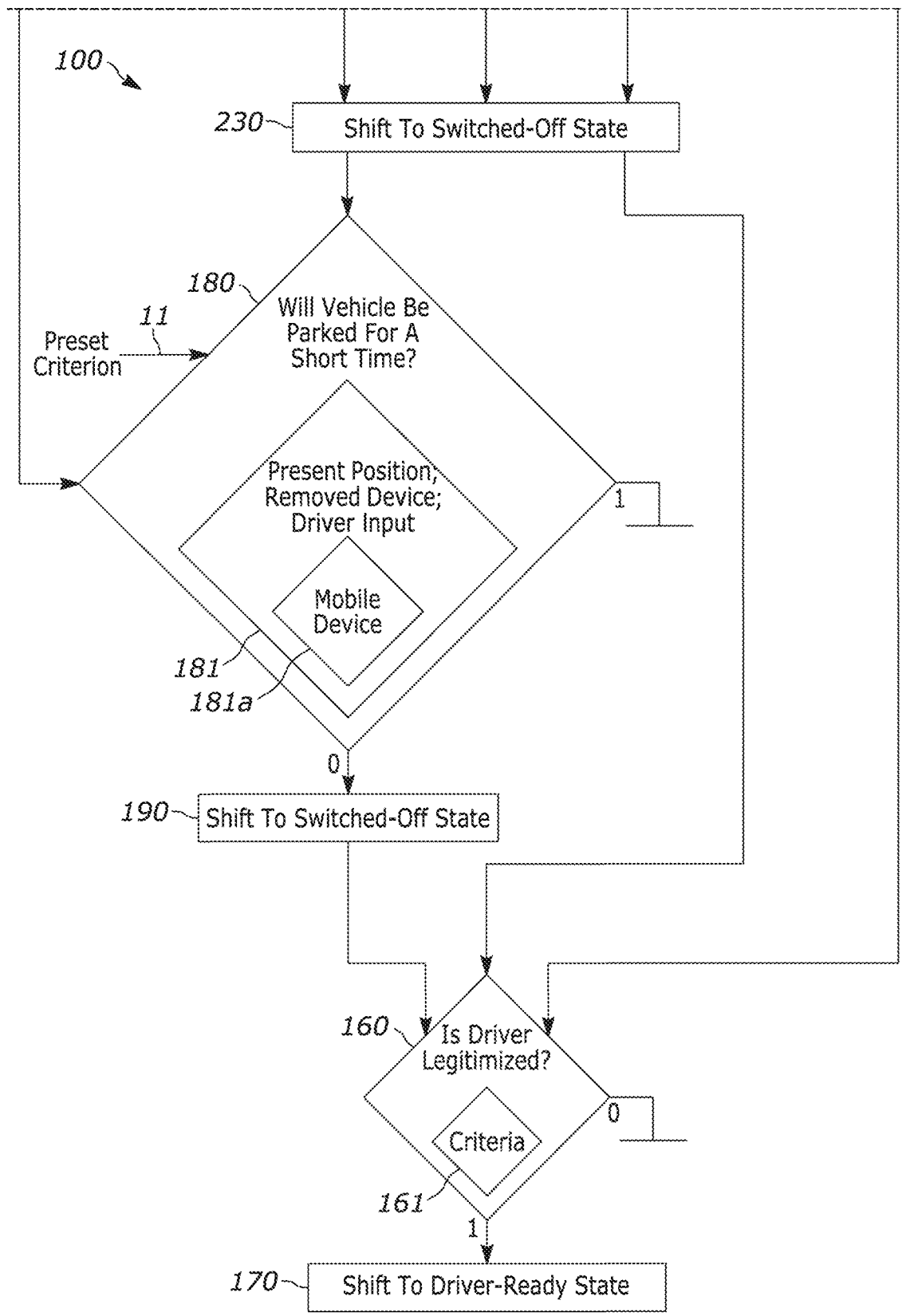
FIG. 1B shows, in continued part, the exemplary embodiment of the method 100 of FIG. 1A.

FIGS. 1A and 1B show a schematic flowchart of an exemplary embodiment of the method 100. In step 105, a utility vehicle intended for the delivery of goods, consignments of letters, consignments of packages and/or piece goods is selected as vehicle 1. In step 110, it is established that this vehicle 1 is parked.

In step 120, a check is now performed using the criterion 10 to ascertain whether the vehicle is likely to be parked for only a short time. If this is the case (probability value 1), the vehicle, in step 130, is shifted from the drive-ready state to the blocking state. Otherwise (probability value 0), in step 140, at least one function check of the electric drivetrain 2 is performed, which function check is intended for ramping down, and in step 150, the vehicle 1 is shifted to the switched-off state.

The shifting to the switched-off state, in accordance with block 151, can include switching off a switch 3a for the supply to the converter 4 in the drivetrain 2 from the DC source 3. Alternatively or else in combination therewith, according to block 152, a capacitor 4a in the converter 4 which buffer-stores the DC voltage from the DC-voltage source 3 can be discharged. The design of the drivetrain 2 is illustrated in more detail in FIG. 2.

In step 180, again a check can be performed in accordance with a preset criterion 11 to ascertain whether the vehicle 1 is still likely to be parked for a short time. If this is not the case (probability value 0), the vehicle 1 is shifted to the switched-off state in step 190.

In step 200, a check can be performed to ascertain whether a preset time span has elapsed since the transition from the drive-ready state to the blocking state. In step 210, a check can be performed to ascertain whether the energy reserve of the DC-voltage source 3 falls below a preset threshold value. In step 220, a check can be performed to ascertain whether an electrical or electronic fault is established in the drivetrain 2. If one of these conditions is met (i.e. if the respective probability value is 1), the vehicle 1 is shifted from the blocking state to the switched-off state in step 230.

In step 160, starting from the blocking state, and/or from the switched-off state, a check is performed to ascertain whether the driver of the vehicle 1 has been legitimized with respect to the vehicle 1. If this is the case (probability value 1), the vehicle 1 is shifted to the drive-ready state again, in step 170. In this case, in accordance with block 161, different legitimization criteria apply depending on whether the start point is the blocking state or the switched-off state.

In accordance with block 121 or 181, the preset criterion 10 or 11 can comprise
- a comparison of the present position of the vehicle 1 with at least one geographical area which is associated with a short-term or non-short-term parking of the vehicle 1;
- removal from the vehicle 1 of a mobile electronic device which is carried along in the vehicle 1 prior to parking of the vehicle 1; and/or
- an input by the driver of the vehicle 1 in respect of whether a short-term or non-short-term parking of the vehicle 1 is intended.

In accordance with block 121a or 181a, the mobile electronic device may be in particular a mobile telephone, a tablet computer, a device for accepting card payments, a device for confirming the delivery of consignments and/or a vehicle key.

Figure 2:
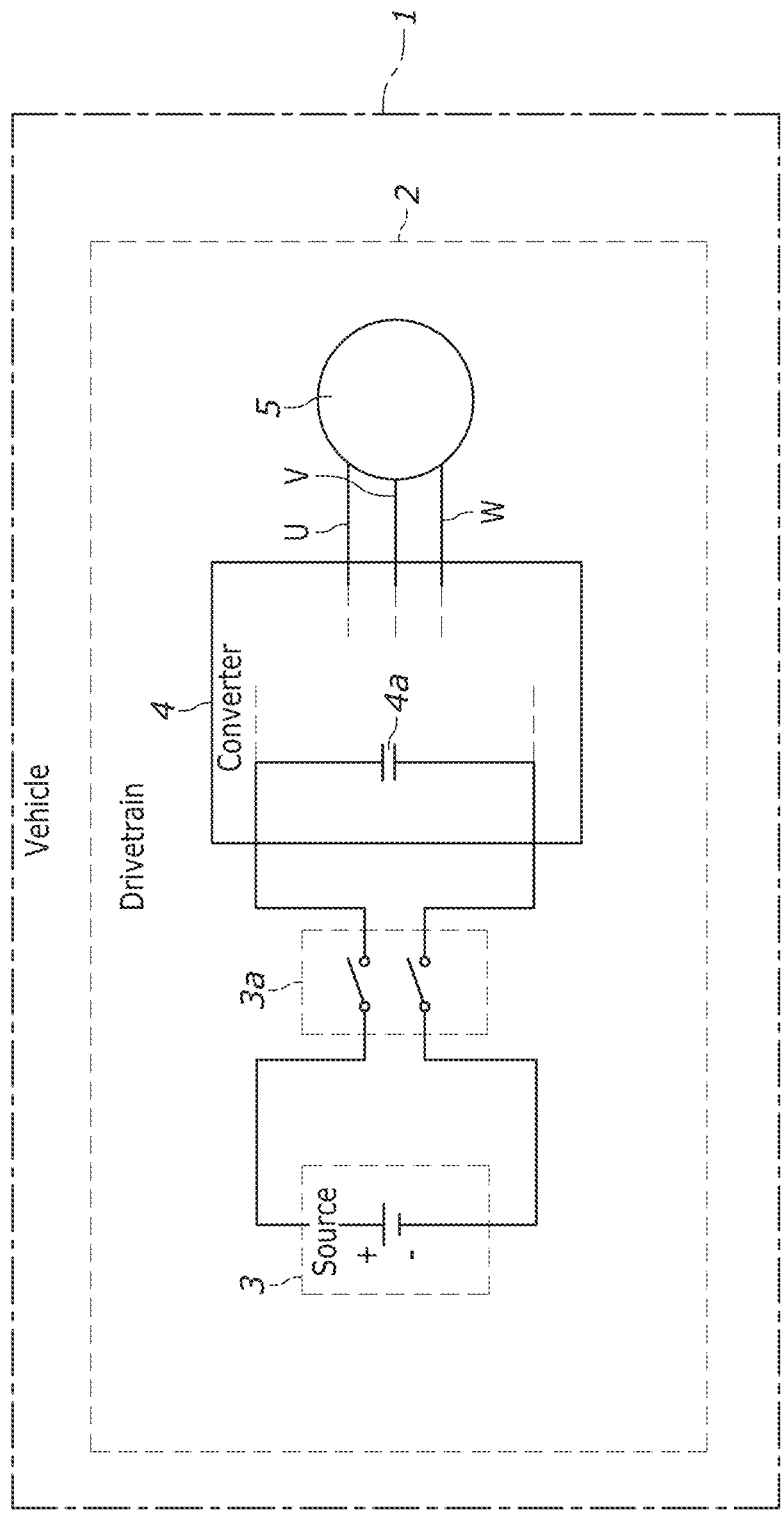
FIG. 2 shows an example of an electric drivetrain 2 for use of the method 100.

FIG. 2 shows an exemplary electric drivetrain 2 for a vehicle 1. A DC-voltage source 3, for example a battery, feeds a converter 4 via a switch 3a, for example a contactor, which converter converts the DC voltage into an, in this example, three-phase AC voltage with the phases U, V and W and connects through to an electric motor 5. The converter 4 contains a capacitor 4a, which buffer-stores the DC voltage. The pre-charging circuit with resistor which prevents excessively quick and steep charging of the capacitor 4a is not illustrated in FIG. 2 for reasons of clarity. The basic functional principle does not change when the number of phases is increased to, for example, six or nine phases.

The invention claimed is:

1. A method (100) for operating a vehicle (1) having an electric drivetrain (2), wherein this electric drivetrain (2) is fed via a DC-voltage source (3) and a converter (4) for converting the DC voltage into a single-phase or polyphase AC voltage, the method comprising the following steps:
   determining (110) that the vehicle (1) is parked; and
   ascertaining (120), using at least one preset criterion (10), whether the vehicle (1) is likely to be parked for only a predetermined short time;
   in response to ascertaining that the vehicle (1) is likely to be parked for only the predetermined short time, shifting the vehicle (1) from a drive-ready state to a blocking state (130), wherein, in the blocking state, the vehicle (1) is protected from unauthorized use, and the converter (4) is supplied the DC voltage from the DC-voltage source (3);

in response to ascertaining that the vehicle (1) is likely not to be parked for only the predetermined short time, performing (140) at least one function check on the electric drivetrain (2) which is intended to ramp down the electric drivetrain (2), and, once this function check has concluded, shifting the vehicle (1) to a switched-off state, in which the vehicle (1) is protected from unauthorized use and the supply to the converter (4) from the DC-voltage source (3) is interrupted.

2. The method (100) as claimed in claim 1, wherein the vehicle (1) is shifted (170) to the drive-ready state starting from the blocking state, and/or from the switched-off state, in response to authenticating (160) a driver of the vehicle (1) with respect to the vehicle (1).

3. The method (100) as claimed in claim 2, wherein different authentication criteria apply for the transition from the blocking state to the drive-ready state and for the transition from the switched-off state to the drive-ready state.

4. The method (100) as claimed in claim 1, wherein, in the blocking state, a check continues to be performed (180) using at least one preset criterion (11) to ascertain whether the vehicle (1) is likely to be parked for only the predetermined short time, and wherein the vehicle (1) is shifted to the switched-off state in response to ascertaining that, in accordance with this check, it is likely not to be parked for only the predetermined short time (190).

5. The method (100) as claimed in claim 1, wherein the at least one preset criterion (10) or the at least one preset criterion (11) comprises:
- a comparison of the present position of the vehicle (1) with at least one geographical area which is associated with a short-term or non-short-term parking of the vehicle (1);
- a removal from the vehicle (1) of a mobile electronic device which is carried along in the vehicle (1) prior to the parking of the vehicle (1); and/or
- an input by a driver of the vehicle (1) in respect of whether short-term or non-short-term parking of the vehicle (1) is intended (121, 181).

6. The method (100) as claimed in claim 5, wherein a mobile telephone, a tablet computer, an electronic device configured to accept card payments, an electronic device configured to confirm the delivery of consignments and/or a vehicle key is selected as the mobile electronic device (121a, 181a).

7. The method (100) as claimed in claim 1, wherein, in response to the fact that a preset time span has elapsed since the transition from the drive-ready state to the blocking state (200); and/or the energy reserve of the DC-voltage source (3) falls below a preset threshold value (210); and/or an electrical or electronic fault is established in the drivetrain (2) (220), the vehicle (1) is shifted from the blocking state to the switched-off state (230).

8. The method (100) as claimed in claim 1, wherein the transition from the blocking state to the switched-off state includes
- switching off a switch (3a) in the form of a mechanical switch or in the form of a contactor for the supply to the converter (4) from the DC-voltage source (3) (151), and/or
- discharging a capacitor (4a) in the converter (4) which buffer-stores the DC voltage from the DC-voltage source (3) (152).

9. The method (100) as claimed in claim 1, wherein the vehicle (1) comprises a utility vehicle intended for the delivery of items.

10. A non-transitory, computer-readable medium containing instructions that when executed by a computer cause the computer to operate a vehicle (1) having an electric drivetrain (2), wherein this electric drivetrain (2) is fed via a DC-voltage source (3) and a converter (4) for converting the DC voltage into a single-phase or polyphase AC voltage, by:
- determining (110) that the vehicle (1) is parked; and
- ascertaining using at least one preset criterion (10) (120) whether the vehicle (1) is likely to be parked for only a predetermined short time;
- in response to ascertaining that the vehicle (1) is likely to be parked for only the predetermined short time, shifting the vehicle (1) from a drive-ready state to a blocking state (130), wherein, in the blocking state, the vehicle (1) is protected from unauthorized use, and the converter (4) is supplied the DC voltage from the DC-voltage source (3);
- in response to ascertaining that the vehicle (1) is likely not to be parked for only the predetermined short time, performing (140) at least one function check on the electric drivetrain (2) which is intended to ramp down the electric drivetrain (2), and, once this function check has concluded, shifting the vehicle (1) to a switched-off state, in which the vehicle (1) is protected from unauthorized use and the supply to the converter (4) from the DC-voltage source (3) is interrupted.

\* \* \* \* \*